(12) United States Patent
Ward

(10) Patent No.: US 6,317,386 B1
(45) Date of Patent: Nov. 13, 2001

(54) METHOD OF INCREASING THE CAPACITY AND ADDRESSING RATE OF AN ULTRASONIC LOCATION SYSTEM

(75) Inventor: Andrew Martin Robert Ward, Cambridge (GB)

(73) Assignee: AT&T Laboratories-Cambridge Limited, Cambridge (GB)

( * ) Notice: Subject to any disclaimer, the term of this patent is extended or adjusted under 35 U.S.C. 154(b) by 0 days.

(21) Appl. No.: 09/476,738

(22) Filed: Dec. 30, 1999

(30) Foreign Application Priority Data

Jan. 22, 1999 (GB) .................................................... 9901300

(51) Int. Cl.[7] ........................................................ G01S 3/80

(52) U.S. Cl. ............................................. 367/127; 367/129

(58) Field of Search ..................................... 367/118, 120, 367/127, 128, 129; 332/108, 109, 112

(56) References Cited

U.S. PATENT DOCUMENTS

| | | | |
|---|---|---|---|
| 3,696,384 | * 10/1972 | Lester | 367/199 |
| 5,453,742 | * 9/1995 | Cox | 341/64 |
| 5,504,477 | * 4/1996 | Whitright et al. | 367/120 |
| 6,141,293 | * 10/2000 | Amorai-Moriya et al. | 367/127 |

* cited by examiner

Primary Examiner—Ian J. Lobo
(74) Attorney, Agent, or Firm—Lee, Mann, Smith, McWilliams, Sweeney and Ohlson

(57) ABSTRACT

An ultrasonic location system for indoor environments, enabling the determination with high accuracy of the positions and orientations of objects to be tracked, wherein transmitting units (20, 22, 24) on the objects to be tracked transmit encoded ultrasonic pulses which are detected by receiver units (12 to 18) located by known positions around a room, and the receiver units are adapted to detect times-of-flight of the ultrasonic pulses in conjunction with decoding of the pulses to identify which time-of-flight applies to each transmitting unit.

15 Claims, 4 Drawing Sheets

METHOD OF INCREASING THE CAPACITY AND ADDRESSING RATE OF AN ULTRASONIC LOCATION SYSTEM

BACKGROUND OF THE INVENTION

This invention concerns ultrasonic location systems.

FIELD OF INVENTION

An ultrasonic location system has been proposed for indoor environments. The system is able to determine the positions and orientations of objects with a high degree of accuracy by measuring the times-of-flight of ultrasonic pulses emitted by transmitters placed on the objects to be tracked, and detected by receivers placed at known points around the room in which they are located. Since the speed of sound in air can be found from measurement of the air temperature in the room, distances from a transmitter to the receivers can be determined, and a process called trilateration is used to calculate the 3D position of the transmitter (and hence the object) from the receiver positions and the computed distances.

The transmitter and receiver must by synchronised, so that pulse times-of-flight can be measured accurately. To achieve this synchronisation, each ultrasonic transmitter unit also has a unique address and a bidirectional radio link to a central controller. The central controller periodically polls each ultrasonic transmitter by sending an addressing message across the radio link, causing the addressed transmitter to emit an ultrasonic pulse. Simultaneously, the central controller resets the time-of-flight counters on the receiver units via a wired network. Since the time-of-flight of the radio signal is insignificant, the ultrasonic pulse will be emitted at practically the same moment that the time-of-flight counters are reset.

In a preferred system the ultrasonic signal currently used for distance measurements is a single, short (<1 ms) pulse, and identification of the source of each ultrasonic pulse is achieved by ensuring that only one transmitter will be triggered to emit an ultrasonic signal within a given period of time, called a timeslot. Where a system includes a central controller whose radio transmissions extend over several rooms, each with its own receiver matrix and containing some of the transmitters, ultrasonic signals can be correctly ascribed to transmitters (which can move between the rooms) by triggering only one of the transmitters known to be located in each of the rooms in each timeslot.

The length of time selected for each timeslot, is the time required for the reverberation associated with an ultrasonic pulse to die down within a room within which the measurements are to be taken. Typically this period is of the order of 20 ms. Each timeslot starts when a transmitter is triggered. During each timeslot, only the pulse from that transmitter can reach receivers in a room, and since the central controller knows which transmitter was triggered, the pulse information gathered by receivers can be ascribed to the correct transmitter. However with a timeslot length of 20 ms, such a system is limited to a maximum of 50 transmitter addresses, and therefore position updates per second.

It is an object of the present invention to provide an improved location system in which information transmitted in the ultrasonic channel can be used to identify the transmitter which has emitted an ultrasound pulse received by one or more receivers.

It is a further object to provide an enhanced transmitter identification system in which a greater number of transmitters in an environment can be triggered and monitored per second, than in systems proposed to date.

SUMMARY OF THE INVENTION

According to one aspect of the present invention, the ultrasound signal emitted by each transmitter when triggered, is encoded with a unique identity and the receivers are provided with decoding means to determine the identity of the transmitter from which each ultrasound pulse has been received.

In one embodiment of this aspect of the invention each ultrasound signal emitted by a transmitter has added thereto identification data which can be decoded by the receivers.

However, efficient ultrasonic transducers have limited bandwidth, and data can therefore only be sent from the transmitters at a relatively low rate. Additionally the large number of reflections caused by flat surfaces in indoor environments (such as walls, furniture, etc.) can result in frequent inter-symbol interference in any ultrasonic data stream received by the receivers.

Furthermore in a system involving a large number of transmitters, the identification address space would have to be large (perhaps 48 bits or more), and the time taken to transmit each address over the ultrasonic channel could therefore be significant. Thus while fill identification is possible in such a system, the rate at which distance-measurement pulses can be emitted by the transmitters where a large number of transmitters is involved, can become reduced, capping the rate at which they can be located and monitored by such a system.

By reducing the identification data to be transmitted so as to identify the source of an ultrasonic transmission, using information within the transmitted signal, the smaller amount of transmitter address information can be transmitted via the ultrasonic channel without so significantly affecting the rate at which the ultrasonic transmitters can be triggered. However by reducing the identification data, it may not reliably identify the source.

According to another aspect of the present invention and so as to overcome the disadvantage linked to the reduced ID data approach, in an ultrasonic location system in which there is an ultrasonic transmission channel, address information to be transmitted using ultrasound is encoded so as to enable a plurality of transmitters to be permitted to emit ultrasound pulses during the same timeslot to permit a corresponding plurality of different transmitter locations to be determined within that timeslot.

In accordance with a preferred feature of the invention therefore, at the beginning of each new timeslot, N different transmitter addresses are selected by the controller and transmitted so as to enable each of the N transmitters to ascertain which of N different encoding techniques is to be used by it when transmitting its ultrasound signal in the timeslot.

The encoding may for example be achieved by pulse shaping or pulse position modulation. However other encoding schemes may be employed.

In one embodiment up to four bits of addressing information may be encoded within an ultrasonic pulse. In such a system each timeslot can be used by 16 transmitters, each of which can emit a differently encoded ultrasonic signal.

In a location system as aforesaid which includes a central controller, the latter may be provided with information as to which transmitter is using a particular encoding and receivers can uniquely ascribe incoming pulses to different transmitters accordingly.

The location rate of such a system can therefore be increased sixteen fold to a system in which unencoded ultrasound pulses are used. Thus in the example given, where the previous maximum number of updates was 50, the system could now address 16×50=800 transmitters per second, and likewise 800 updates per second.

If encoding using pulse shaping is employed, each receiver may be adapted to identify pulse shape to enable each transmitted pulse to be identified as to the originating transmitter.

According to a preferred arrangement, in a system in which there are more than 16 transmitters to be triggered, and which incorporates a central controller, the latter can be adapted to command different groups of transmitters to use different particular pulse encoding techniques during each timeslot. This is most simply achieved by incorporating pulse encoding information in an addressing message sent to all transmitters, so that each transmitter is allocated a particular pulse encoding technique by the central controller at the beginning of each timeslot.

In such a system in which there are 16 different pulse encoding possibilities, the radio message sent at the start of each timeslot will typically contain the addresses of 16 of the transmitters, and in the transmission each address is allocated one of the 16 pulse encodings to be employed. In such a system when a transmitter detects an addressing message containing its unique address, it is also able to determine the associated pulse encoding to be employed, and emits an appropriately encoded ultrasound pulse.

In a particularly preferred arrangement, the encoding technique to be used by each transmitter may for example be identified by virtue of the position of the address for that transmitter within the list of addresses.

Alternatively the transmitter addressing message may contain extra bits of data which are linked to each address, to instruct the addressed transmitter as to the pulse encoding technique to use.

The invention will now be described by way of example, with reference to the accompanying drawings, in which.

Figure 1:
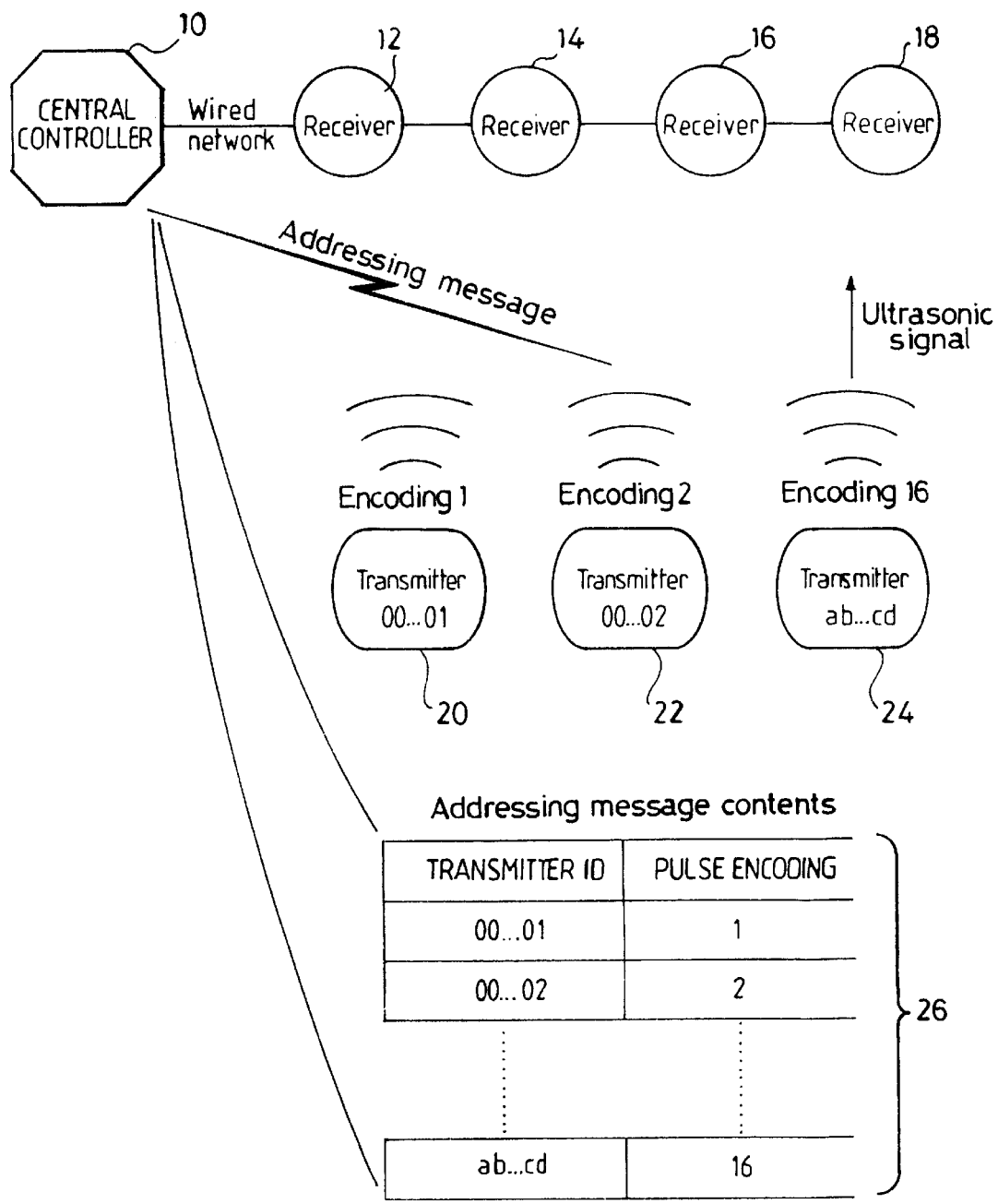
FIG. 1 illustrates an improved location system with an explicit address-encoding link.

In the system shown in FIG. 1, a central controller is denoted by reference numeral 10 and a series of receivers 12, 14, 16 and 18 are shown hard wired to the central controller.

The central controller 10 serves to transmit radio trigger signals to each of a large number of transmitter units within the environment controlled by the controller 10. Each trigger signal is intended to reset the time counting registers in the receivers 12, 14 etc, and to cause selected transmitters within the region controlled by the controller 10 each to emit a uniquely encoded short 1 ms ultrasound burst of ultrasound. The latter is received by some of the ultrasonic receivers 12, 14, 16 etc and the time delay between the triggering of the ultrasonic transmissions and the receipt of the transmitted pulses by the receivers is given by the number in the register in each receiver at the time when each ultrasonic pulse is received by the receiver. To this end upon the receipt of an incoming ultrasonic pulse the numerical value in the counter is associated with the decoded identification for the received pulse and stored so as to be available to the central controller upon being called for.

The higher the number associated with each transmitter identification, the longer the time taken for the ultrasonic pulse to transit from that transmitter to the receiver, and therefore the longer the distance from that transmitter to the receiver.

In one arrangement at the beginning of a timeslot, a series of sixteen different encoding instructions are first simultaneously sent to 16 transmitter addresses. The transmitters are triggered and each transmitter utilises one of the 16 differing encoding techniques.

To reduce the amount of data to be transmitted at the beginning of the timeslot, the encoding technique to be utilised by each address, may simply be determined by its position in the list of addresses transmitted, so that if a transmitter address is fifth in the sequence of addresses, that transmitter uses the fifth of sixteen different encoding techniques stored in a memory in the transmitter.

Alternatively for example each of the addresses of 16 of the transmitters are transmitted in sequence at the beginning of a timeslot and encoding instructions are added to each address, indicating to the addressed transmitter the encoding technique to be utilised by it when it emits its ultrasonic signal.

In any case the transmitter encoding technique used simply indicates a relationship (mapping) between a transmitter identification and a particular pulse coding. These relationships constitute a mathematical object which is stored to enable either one value of each stored pair (transmitter identification and coding) to be determined from the other.

The information transmitted at the beginning of a timeslot is shown at 26 in the lower part of the drawing. In this particular case it is assumed that an additional piece of information will be transmitted at the end of each transmitter address, and the information transmitted by the central controller therefore comprises in each case the transmitter ID such as 00 . . . 01 followed by the pulse encoding information which for the sake or argument may be the binary code of the numerals 1, 2, 3 etc up to 16, each identifying a different type of encoding all 16 of which are stored in each transmitter to be available for use as instructed and all 16 of which are stored in and available to the receivers to allow identification and decoding of received ultrasonic signals.

The invention requires each transmitter to include an encoding device (not shown) so that the ultrasound signal transmitted by the transmitter is encoded in a particular way according to the encoding information instructed for use by that transmitter, at the beginning of the timeslot as described.

It is to be noted that the encoding technique is only unique to that particular transmitter for the timeslot in which the transmitter is triggered. Whilst the same encoding technique could be instructed for the same transmitter if it is to be triggered in each of a sequence of timeslots, it is just as likely that different encoding techniques will be instructed for that transmitter during subsequent timeslots in the sequence.

In a refinement of the system described, the sequence of different encodings 1 to 16 may be instructed to occur at 16 different intervals of time during each 20 ms timeslot, so that there is at least 20 ms before the same encoding instruction is utilised in a subsequent timeslot by the same or another ultrasound transmitter.

By incorporating a large number of different encodings such as 16 encodings within the same timeslot, that number of different transmitters can be triggered within the timeslot so as to each emit its own uniquely encoded ultrasound signal, and if each receiver is programmed so as to identify when each of the differently encoded ultrasound signals is first received by it, the system can make distance computations on the ultrasound signals received in the timeslot, and relate thereto different transmitters.

Each receiver may need to be more complex than those proposed for previous systems of this nature, in that each receiver needs to have a decoding circuit associated therewith for distinguishing between the differently coded ultrasound signals, and circuit means to enable the numerical value in the incrementing register to be recorded in different memories (or memory locations) as each differently encoded ultrasound signal is received, thereby to enable the time delays to be accurately computed for each differently encoded ultrasound signal received by the receiver.

Where the central controller 10 triggers each of the 16 different transmitters at 16 different points during a 20 ms timeslot, the trigger signal associated with each different transmitter address must be relayed to the receivers so as to enable the then current number in the incrementing receiver register at the beginning of each trigger signal to be noted and to enable that value to be related to the later higher number (if any) which is identified as coinciding with the arrival of the correspondingly encoded ultrasound signal from the triggered transmitter. The time for the ultrasound signal to transit from the transmitter to the receiver is then determined by subtracting the lower register value from the higher register value for that particular encoding.

Figure 2:
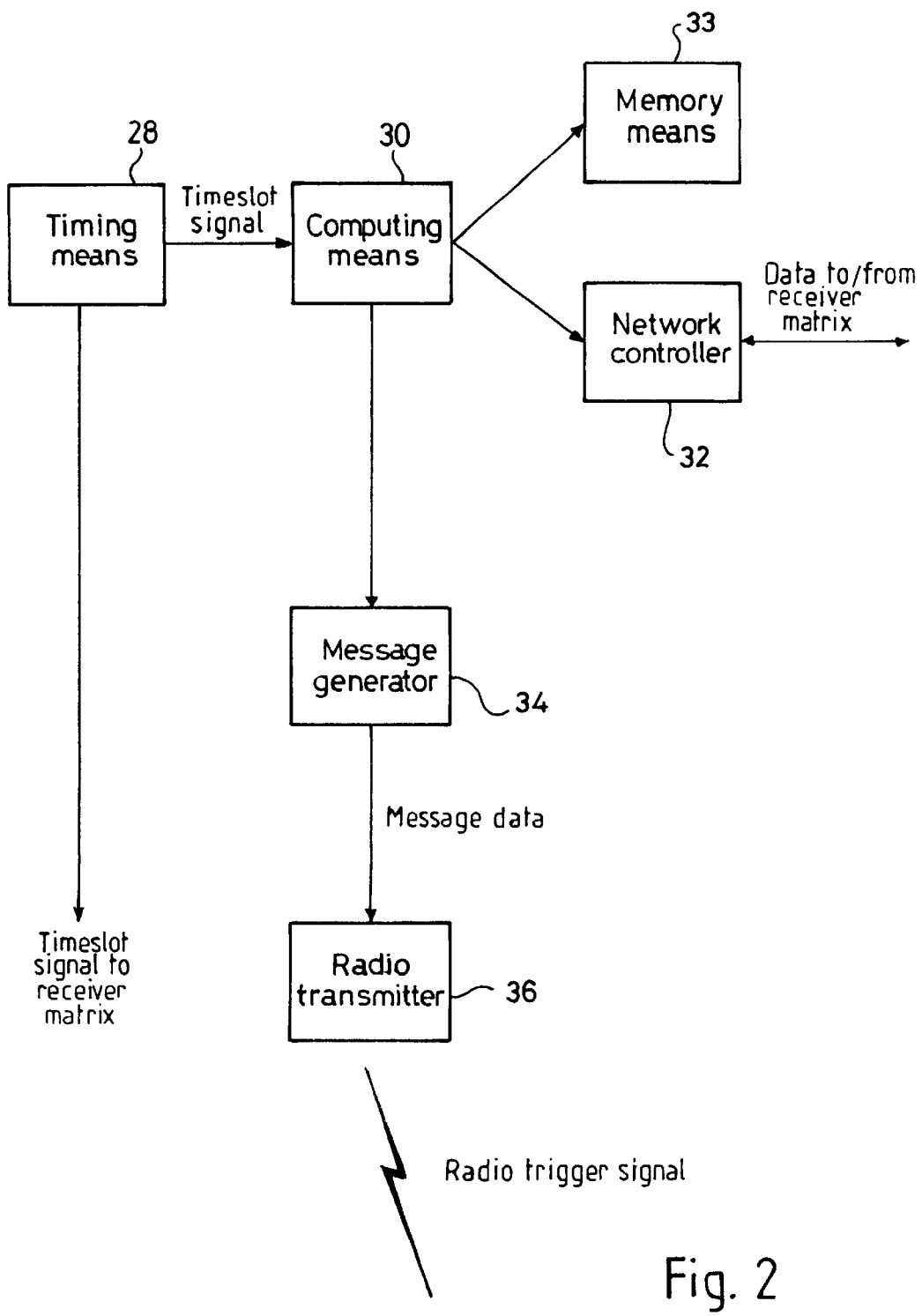
FIG. 2 is a block schematic diagram of a central controller shown in FIG. 1.
Figure 3:
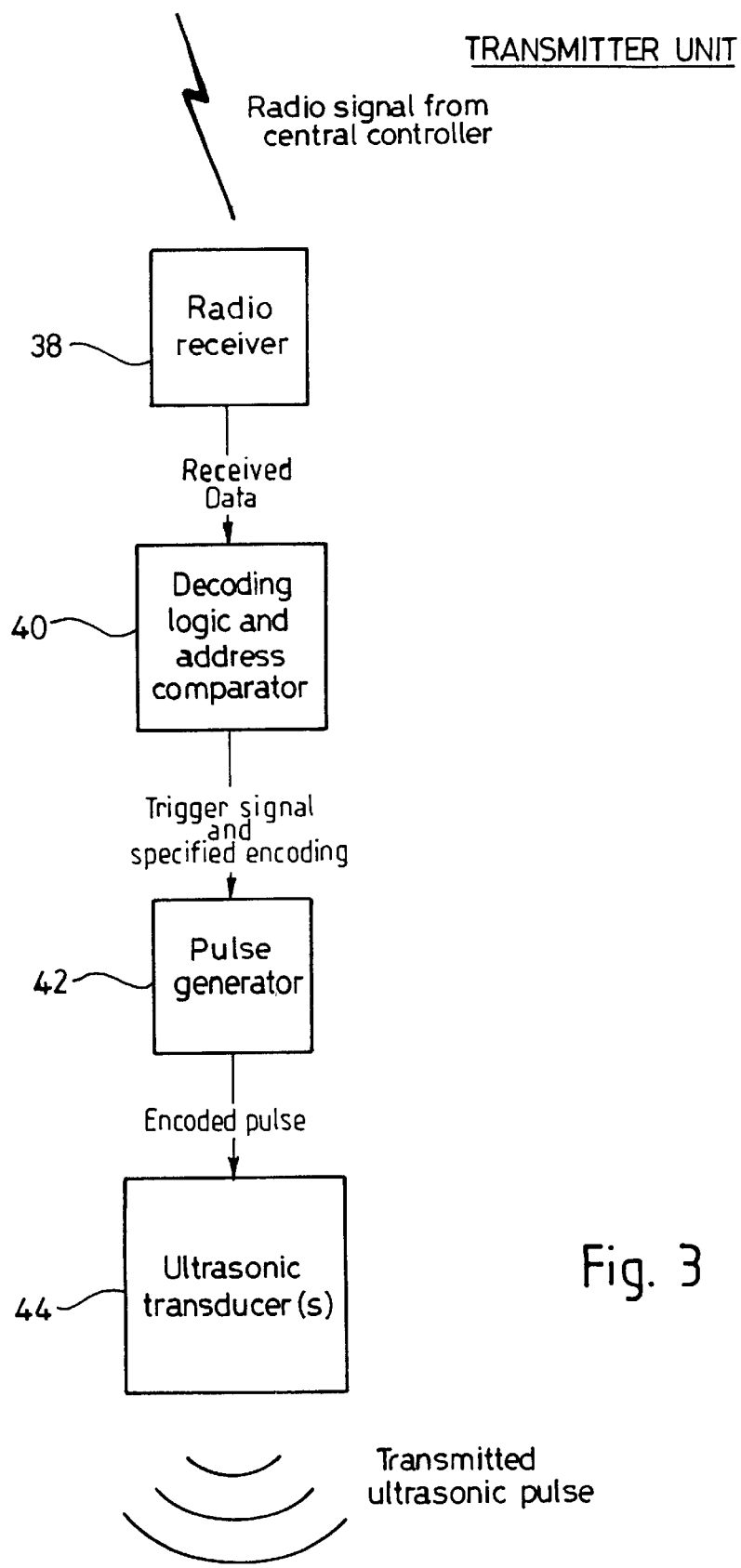
FIG. 3 is a block schematic diagram applicable to each of three transmitters shown in FIG. 1.
Figure 4:
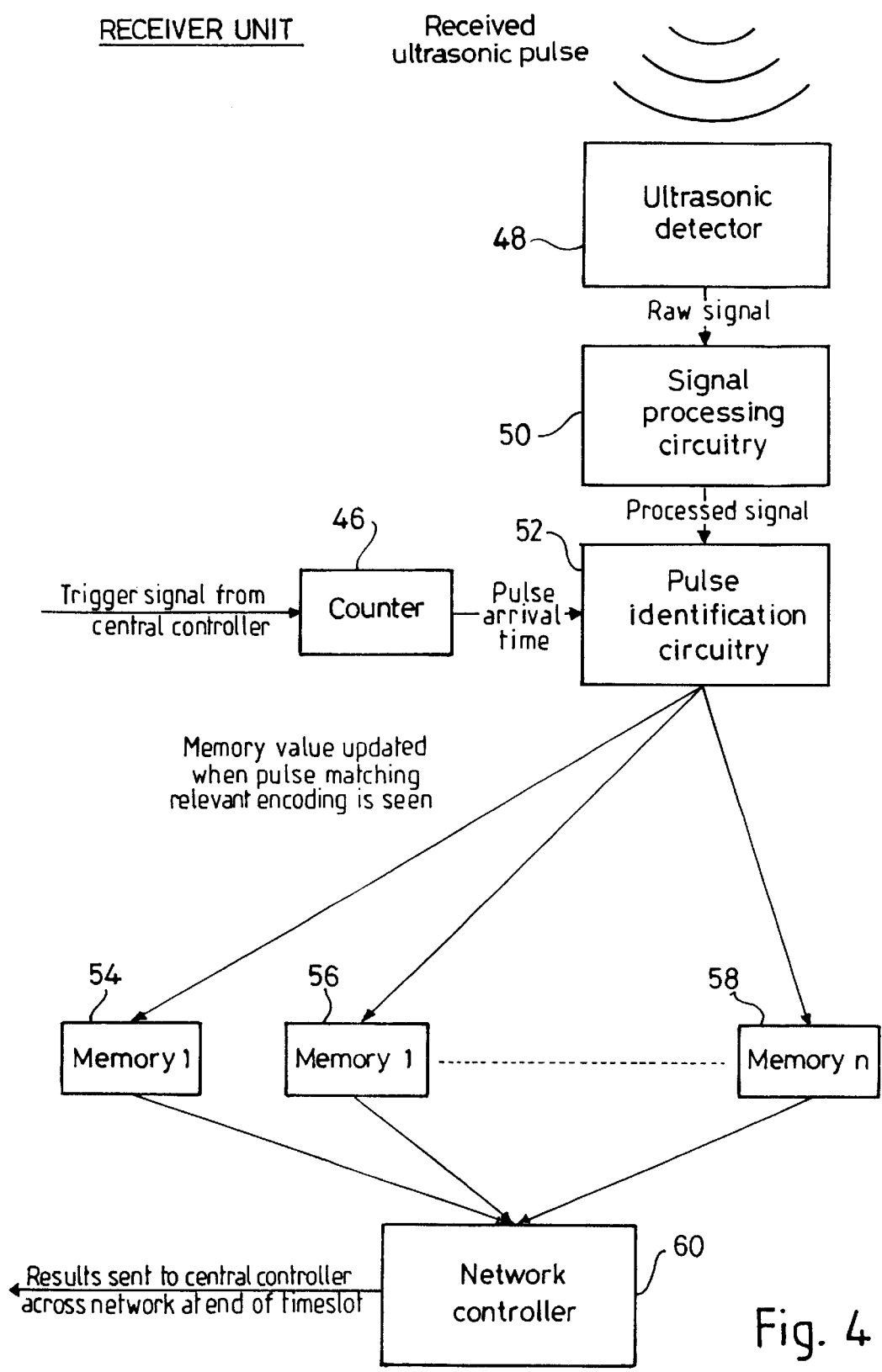
FIG. 4 is a block schematic diagram of each of four ultrasound receivers shown in FIG. 1.

Referring now to FIGS. 2 to 4 a timing mechanism 28 periodically sends a start-of-timeslot signal to a computing means 30 in the central controller and a set of receivers. Upon receipt of the timing signal, the computing means 30 selects n transmitters to be located, and allocates one of n encodings to each. The <transmitter.encoding> mapping is stored in a memory 33, and is passed to a message generator 34. The message generator 34 assembles the encoding into a data stream, which is then transmitted by a radio transmitter 36.

A radio receiver 38 in FIG. 3 on each transmitter unit detects the data stream sent by the central controller. The data is examined by decoding logic and an address comparator 40 to determine whether the message instructs that particular transmitter to send an ultrasonic signal in that timeslot (see main document). If the message does instruct that transmitter to send an ultrasonic signal, the decoding logic 40 determines which pulse encoding is to be used by that transmitter, and passes this information to a pulse generator 42. The pulse generator 42 constructs a suitably encoded pulse that is emitted by one or more ultrasonic transducers 44.

As depicted in FIG. 4, receivers have an on-board counter 46 that is reset by the start-of-timeslot signal generated by the timing means 28 of the central controller. An ultrasonic detector 48 on each receiver picks up any signals that reach the receiver from transmitters, and passes those signals through signal processing circuitry 50 to pulse identification circuitry 52. If the pulse identification circuitry 52 matches the incoming signal with one of the n pulse encodings used by the location system, it stores the current value of the counter in a memory cell (54, 56, . . . 58) associated with that encoding. Only the first receipt of a pulse with a particular encoding within a timeslot is noted, to ensure that times-of-flights of reflected signals are not recorded.

When the computing means 30 (FIG. 2) determines that the period for ultrasonic measurements is over, it polls the receivers via its network controller 32. Timing results stored in the memories of each receiver are passed to the central controller 30 via the network controllers 60 (see FIG. 4) on each receiver, as are the memory cell numbers associated with each timing result. The computing means 30 then identifies the transmitter that generated the pulse corresponding to each result by matching the memory cell number of each timing result with the <transmitter, encoding> information stored in the memory 33.

The central controller can therefore determine the time-of-flight of the ultrasonic pulses from each transmitter to the receivers that detected those signals, and can then calculate the position of the transmitter using the known receiver positions and the speed of sound in air. The timing means 28 then generates another start-of-timeslot signal, and thee cycle begins again.

The above description (together with FIGS. 2, 3 and 4) outlines an arrangement in which all transmitters send their encoded pulses simultaneously at the start of the timeslot.

The description also illustrates the case in which the receivers are polled by the central controller at the end of each timeslot to retrieve any <encoding.time> pairs they may have stored. The central controller then matches its table of <transmitter.encoding> values with these readings to determine the pulse times-of-flight from each transmitter. Alternatively however this matching process could be performed "on-the-fly" by the receivers, if the central controller informs the receiver of the chosen <transmitter,encoding> mapping information at the start of each timeslot.

Since several collocated transmitters may emit ultrasound in the same timeslot, there exists the possibility that several ultrasonic pulses may reach a receiver at approximately the same time, and that the receiver will thus detect overlapping pulses. If receivers cannot separate these overlapping pulses using signal processing techniques, they will not report times-of-flight measurements for those pulses in that timeslot. Normally, however, this is not a problem; if the pulses are short, eg 1 ms as above mentioned, most receivers will not detect overlapping pulses, because the distance from each receiver to each of the transmitters will, in almost all instances, be different.

What is claimed is:

1. An ultrasonic location system for determining the positions and orientations of objects by measuring the times-of-flight of ultrasonic pulses emitted by transmitter units placed on the objects to be tracked, and detected by receiver units synchronised with the transmitter units and placed at known points around a room in which they are located, wherein transmitter unit address information to be transmitted using ultrasound is encoded so as to enable a plurality of transmitter units to be permitted to emit ultrasound pulses during a common timeslot, whereby to permit a corresponding plurality of different transmitter unit locations to be determined within that timeslot, at the beginning of each new timeslot, one of N available different ultrasonic encoding techniques is allocated to each of N different transmitter unit addresses selected by a central controller, and this allocation information is transmitted to enable each of the N selected transmitter units to determine which of the N encoding techniques is to be used by that transmitter unit during that particular timeslot.

2. A system according to claim 1, wherein the speed of sound in air is determined from measurement of the air temperature in the room to enable distances from a transmitter unit to the receiver units to be determined, and a trilateration process is used to calculate the 3D position of the transmitter unit (and hence the object) from the receiver unit positions and the computed distances.

3. A system according to claim 1, wherein, to achieve transmitter unit/receiver unit synchronisation, each ultrasonic transmitter unit is given a unique address and a bidirectional radio link to the central controller, and the central controller periodically polls each ultrasonic transmitter unit by sending an addressing message across the radio link, causing the addressed transmitter unit to emit an ultrasonic pulse, whilst simultaneously the central controller resets time-of-flight counters on the receiver units via a wired network.

4. A system according to claim 1, wherein the encoding is achieved by pulse shaping or pulse position modulation.

5. A system according to claim 1, wherein the central controller is provided with information as to which transmitter unit is using a particular encoding and receivers are able uniquely to ascribe incoming pulses to different transmitters accordingly.

6. A system according to claim 4 wherein, when encoding using pulse shaping is employed, each receiver unit is adapted to identify pulse shape to enable each transmitted pulse to be identified with respect to the originating transmitter unit.

7. A system according to claim 1, wherein up to four bits of addressing information are encoded within an ultrasonic pulse, enabling each timeslot to be used by 16 transmitter units, each of which emits a differently encoded ultrasonic signal.

8. A system according to claim 1, in which there are more than 16 transmitter units to be triggered, and the central controller is being adapted to command different groups of transmitter units to use different particular pulse encoding techniques during each timeslot.

9. A system according to claim 8, wherein the said command is achieved by incorporating pulse encoding information in an addressing message sent to all transmitter units, so that each transmitter is allocated a particular pulse encoding technique by the central controller at the beginning of each timeslot.

10. A system according to claim 1, wherein the encoding technique to be used by each transmitter unit is identified by virtue of the position of the address for that transmitter unit within a list of addresses.

11. A system according to claim 1, wherein the transmitter unit addressing message contains extra bits of data which are linked to each address, to instruct the addressed transmitter unit as to the pulse encoding technique to use.

12. A system according to claim 1, wherein at the beginning of a particular timeslot, a timing signal is sent to the central controller to cause generation of address encodings for the transmitter units, and the transmitter unit encodings are stored in a memory and also passed to a message generator which assembles the codes into a data stream which is then sent to the transmitter units in which the encodings are stored ready for use of a particular encoding by each transmitter unit when that transmitter unit is triggered during that particular timeslot.

13. A system according to claim 12, wherein each receiver unit incorporates decoding means storing the transmitter unit encodings, enabling each receiver unit to distinguish between differently encoded ultrasonic signals received by that receiver unit.

14. A system according to claim 12, wherein the transmitter units are triggered by the central controller during each particular timeslot.

15. A system according to claim 12, wherein, at the end of a particular timeslot, the receiver units are polled by the central controller to retrieve the time-encoding pairs stored therein, and the central then matches these pairs with transmitter codings stored in memory in said controller in order to determine the ultrasonic pulse times-of-flight from each transmitter for each receiver.

* * * * *